(12) United States Patent
Peto et al.

(10) Patent No.: US 8,935,204 B2
(45) Date of Patent: Jan. 13, 2015

(54) METADATA TAGGING OF MOVING AND STILL IMAGE CONTENT

(75) Inventors: David Peto, London (GB); Stef Lewandowski, Harpenden (GB)

(73) Assignee: Aframe Media Services Limited, Newcastle Upon Tyne (GB)

(*) Notice: Subject to any disclaimer, the term of this patent is extended or adjusted under 35 U.S.C. 154(b) by 181 days.

(21) Appl. No.: 12/857,143

(22) Filed: Aug. 16, 2010

(65) Prior Publication Data

US 2011/0040754 A1 Feb. 17, 2011

Related U.S. Application Data

(60) Provisional application No. 61/233,928, filed on Aug. 14, 2009.

(51) Int. Cl.
G06F 17/30 (2006.01)
G06F 17/21 (2006.01)
G06F 17/24 (2006.01)
G10L 15/26 (2006.01)

(52) U.S. Cl.
CPC .......... *G06F 17/3028* (2013.01); *G06F 17/218* (2013.01); *G06F 17/241* (2013.01); *G06F 17/3082* (2013.01); *G10L 15/26* (2013.01)
USPC ........................................ 707/621

(58) Field of Classification Search
USPC ........................................ 707/740
See application file for complete search history.

(56) References Cited

U.S. PATENT DOCUMENTS

2002/0103901 A1 8/2002 Yoshida
2002/0143972 A1 10/2002 Christopoulos et al.
2002/0191858 A1* 12/2002 Sindhu .......................... 382/261
2004/0143598 A1 7/2004 Drucker et al.
2005/0228665 A1 10/2005 Kobayashi et al.

(Continued)

FOREIGN PATENT DOCUMENTS

EP 1 199 877 A2 4/2002
EP 1 876 596 A2 1/2008

(Continued)

OTHER PUBLICATIONS

"Patents Act 1977: Search Report under Section 17(6)", for GB Application No. GB0914300.9, dated Apr. 13, 2010, 2pgs.

(Continued)

*Primary Examiner* — Wilson Lee
(74) *Attorney, Agent, or Firm* — Buckley, Maschoff & Talwalkar LLC (57) ABSTRACT

A method and apparatus for tagging image content with rich metadata is provided. The metadata is generated from keyword descriptions of image content spoken by human taggers while viewing the content. Voice recognition software is employed to identify the key keywords in an audio stream and the resultant metadata is associated in a synchronous manner with the relevant image content. A control console allows the human tagger to rapidly navigate onscreen menus and select different taglines for providing multilevel metadata tagging of the image content. An integrated system provides for the storage of tagged digital image content, with near immediate access to tagged raw footage for viewing and editing, and for easy searching and accessing of finalized footage. A method of serving the tagged content is also provide, which allows the content to be streamed over the web at an acceptable image resolution while maintaining the associated metatags.

11 Claims, 8 Drawing Sheets

(56) References Cited

U.S. PATENT DOCUMENTS

| | | |
|---|---|---|
| 2006/0156375 A1* | 7/2006 | Konetski .................. 725/135 |
| 2007/0097421 A1 | 5/2007 | Sorensen et al. |
| 2007/0174326 A1 | 7/2007 | Schwartz et al. |
| 2008/0198247 A1* | 8/2008 | Yonaha .................... 348/254 |
| 2008/0281592 A1 | 11/2008 | McKoen et al. |
| 2009/0063449 A1* | 3/2009 | van Zwol .................... 707/5 |
| 2009/0063496 A1 | 3/2009 | Cunningham et al. |
| 2009/0097815 A1* | 4/2009 | Lahr et al. .................. 386/52 |
| 2009/0103901 A1 | 4/2009 | Endo et al. |
| 2009/0119706 A1* | 5/2009 | Hope et al. .................. 725/38 |
| 2009/0254539 A1* | 10/2009 | Wen et al. ................... 707/5 |
| 2009/0271380 A1* | 10/2009 | Julia et al. .................... 707/3 |
| 2009/0300528 A1* | 12/2009 | Stambaugh .............. 715/764 |
| 2009/0324137 A1* | 12/2009 | Stallings et al. ............ 382/306 |
| 2010/0054600 A1* | 3/2010 | Anbalagan et al. ......... 382/180 |

FOREIGN PATENT DOCUMENTS

| | | |
|---|---|---|
| WO | 2004/104759 A2 | 12/2004 |
| WO | 2007/035637 A2 | 3/2007 |
| WO | 2007/084871 A2 | 7/2007 |

OTHER PUBLICATIONS

"Patent Act 1977: Combined Search and Examination Report under Section 17 and 18(3)", for GB Application No. GB0914300.9, dated Nov. 17, 2009, 9pgs.

"PCT International Search Report and Written Opinion", dated Jan. 20, 2011, for PCT/GB/2010/001546, 19pgs.

* cited by examiner

METADATA TAGGING OF MOVING AND STILL IMAGE CONTENT

CROSS-REFERENCE TO RELATED APPLICATION

The present application claims benefit of and priority to U.S. Provisional Patent Application Ser. No. 61/233,928 filed Aug. 14, 2009 and entitled "Metadata Tagging of Moving and Still Image Content", the contents of which are incorporated herein by reference for all purposes.

FIELD OF THE INVENTION

The present invention relates to the tagging of moving and still image content with metadata, and more particularly to an improved method and system for the metadata input and to the provision of tagged content.

BACKGROUND TO THE INVENTION

The creative industries worldwide are facing a time-bomb that threatens their future profitability. It is data, and more specifically the thousands of terabytes of moving image content being created every day. At the same time they are unable to access and realise the value of the hundreds of thousands of hours of archive content they have already created. This failure to "sweat" their most valuable asset, their content, is the biggest barrier to the success and long term value of all video based creative companies, from broadcasters, to government agencies, independent television production companies, to advertising agencies and beyond. They are already unable to cope with the current volume of data, but with the move to filming on Digital Film cameras, which no longer capture to film or tape, the problem is set to explode.

As a temporary expedient the industry has resorted to stop-gap measures, whereby millions of pounds worth of footage is being stored on consumer grade portable hard drives in insecure locations, with no backup. Thus, a library of tapes that can be stored securely for up to 30 years and be catalogued, is being replaced by drives that have an average life span of 5 years, on which the data is degrading every single day, with thousands of video files that cannot be searched.

A piece of footage is considered valueless if it cannot be found within two hours. As a result, creative companies are losing millions of pounds worth of assets every single year. If unchecked, hundreds of thousands of hours of content will be lost. This will not only affect straight initial revenue, companies also by definition will not be able to reuse it in future productions, be unable to deliver it to the fast growing (£4.37 billion by 2012) online video market, and miss the opportunity to market raw footage to other content creators.

Their archives of existing content are also sitting, unexploited, in costly storage facilities. In the UK the BBC has 5.5 miles of shelves of un-digitized archive content. IMG media has 300,000 tapes stored at a cost of £2 per tape per year. All such companies are missing out on valuable revenue, with the UK archive market alone valued at £1.5 billion by 2014. These companies are faced with a huge infrastructure and staffing investment in order to rectify this. They simply cannot afford to do it, but nor can they afford not to. The obvious solution is outsourcing and yet, until now, no commercial company has presented a viable alternative.

Video content cannot be found because it cannot be searched. It has no associated words. The key is to add associated words to footage in the form of keywords, known as "metadata". Once "tagged" with such metadata, the tagged content can be searched by a search engine, either an internal engine or else an external engine, such as Google or Yahoo.

Currently, companies are attempting to automate metadata addition to finished video content, by using technologies such as speech to text, which is only 40% accurate, and face recognition. However, neither technique gives the user the actual content of a scene, which is crucial for making it searchable on multiple criteria, and hence valuable to an end user. Moreover, these methods are not reliable and, since they are only currently used on finished content, do not help content producers search their raw footage in order to create quicker, more profitable programming. In addition there is often no money available to create accurate or adequate metadata, as a programme's budget has already been spent.

The only way of adding rich metadata is to get human beings to do it. However, even then, adding metadata with multiple layers by typing it in manually is far too slow a process. For example, content may be tagged with multiple layers relating to Character, Location, Object, Story, Context, and Emotion. Studies on the manual addition of such rich metadata show it taking between 4-8 hours per hour of content.

Within the production community, basic metadata is being added to raw content by teams of untrained assistants who hate doing the job, and hence do it poorly and slowly. "Logging" as this process is called is frequently still done on paper. However, the logging tools currently in existence do not provide enough fields for rich metadata to be added. As it has to be typed in, the process is too slow. Moreover, because these are bespoke systems, once the footage leaves the system it instantly loses the associated metadata, rendering it less valuable. Some metatagging software has been created to facilitate the tagging process, a good example being "Frameline" (see http://www.frameline.tv). However, as it is still involves manual entry by keyboard, it is too slow, and again, it is bespoke.

Since the only viable current solution to adding metadata involves humans and manually typed input, the process is too slow and makes the proposition of adding metadata quickly to large quantities of footage financially unviable.

The use of manual typed input is one of the key limiting factors. Even with an automatic spell-check facility, it is slow and inaccurate. It also means that an operator has to concentrate on the keyboard as well as the screen, regardless as to whether they are a touch typist. In conjunction with this, in order to move between different metadata layers in each clip, the operator typically has to move a computer mouse to select to different entry boxes. Whilst doing this, the operator is no longer able to type, which means they that the footage being watched must temporarily be paused, thereby slowing the process yet further.

In addition to the issues discussed above, there are a number of other problems which arise when using humans for manual logging. Although straightforward in principle, the repetitive adding of metadata to large quantities of content results in lack of concentration and boredom. As a consequence, greater than a few minutes spent concentrating on a single clip can lead to a rapid decrease in the quality of tagging. Further to this, a major problem is what might be termed "brainfreeze", where an operator simply runs out of things to say and is left unable to add metadata to content quickly enough. This again, means the footage having to be paused, or most likely rewound, demoralising the operator and resulting in further decreases in quality.

As will be appreciated, there is a clear need for an improved method of processing and metatagging image content such as video content, which would in turn facilitate the provision of such metatagged content and alleviate many of the problems outlined above.

SUMMARY OF THE INVENTION

According to a first aspect of the present invention, a computer implemented method of tagging image content comprises the steps of:
receiving image data comprising digital image content;
displaying the digital image content visually;
receiving an indication of a selected one of a plurality of characteristics associated with the image content currently being displayed;
identifying a respective metadata tagline corresponding to the selected characteristic;
receiving an audio data stream comprising audio content, the audio content comprising spoken keywords describing one or more characteristics associated with the image content being displayed, respective keywords being spoken by a human tagger in response to the image content currently being displayed;
identifying the keywords received in the audio content and generating metadata therefrom; and,
associating the metadata with the image content as metadata tags synchronously with the occurrence of the respective keywords in the audio data stream,
wherein the steps of generating and associating the metadata with the image content are performed in dependence on the respective metadata tagline, and
wherein the indication of the selected one of the plurality of characteristics is received from a control pad having a plurality of keys or buttons, each of the keys or buttons being assigned to a different one of the plurality of characteristics.

The method is typically implemented on a computer with processor, memory, visual display unit, keyboard and mouse. However, the invention removes the need for a keyboard for manual data entry of the keywords for the metadata tagging process, instead using voice input, and likewise removes the need for keyboard and/or mouse for selecting the metadata taglines, instead using a separate control pad. The combination of receiving audio data input and navigation signals from a control pad provides a powerful alternative technique for metadata tagging of image content by a human tagger, which for the first time facilitates rich metadata tagging at a speed and accuracy to make the process viable for many applications. A conventional keyboard and mouse may still be used for ancillary navigation and data entry.

Preferably, the tagline is displayed visually together with the respective keywords describing the selected characteristic associated with the image content currently being displayed.

The selected characteristics could relate to a wide range of different aspects of the image content and for which multiple layers of metadata can be associated with the content to provide for very rich tagging. Such characteristics may comprise one or more of: Character, Location, Story, Object, Background, Emotion, and Action.

In this way, rich metadata may be added to content up to four times faster and significantly more cost effectively than is currently possible.

In some embodiments, the received image data comprises digital image content having a second image resolution and the method further comprises the steps of:

storing the metadata in a central database; and,
associating the metadata with a stored file comprising the image content having a first image resolution which is greater than the second image resolution.

This allows a lower resolution version of the image content to be transmitted to the local or remote tagging station and to be more readily manipulated by the human tagger during the tagging process, whilst ensuring that the resulting rich metadata tags are associated Typically, the keywords are extracted from the audio data using a digital speech recognition technique. The audio content may be filtered to remove extraneous noise and/or predetermined words.

Although the metadata is associated with the image content near synchronously with the occurrence of the respective keywords in the audio data stream, account may be taken of the length of the respective keywords. Furthermore, allowance may be made for the latency of the human tagger speaking the keywords. In this way, the association of the metadata can take account of various factors affecting the precise synchronisation of the original spoken keywords with the corresponding image content.

In preferred applications, the digital image content is digital video content, either with or without sound. More preferably, the image content is unfinalised "raw" content that can be further manipulated following its tagging with metadata. Thus, unlike known techniques, the present invention allows the addition metadata to raw content at the most cost effective stage, namely the moment it is created. Of course, the invention may equally be applied to still images or a series thereof, as well as finalised video content.

The tagging activity can be performed in a collaborative manner, with several human taggers working on the tagging of related content, including different sections of the same image content. As such, data derived from the input of one tagger can automatically and advantageously be displayed to another tagger. The data can take many forms, including information directly related to the content being tagged and also motivational information.

For example, in order to keep a given human tagger informed of the activity of other taggers, and to provide a useful accessible "dictionary" of keywords, the method may further comprise the step of displaying tags generated from the spoken input of other human taggers working on the tagging of related image content.

In addition, or alternatively, in order to provide incentive and promote competition between taggers, performance data associated with the performance of a given human tagger may be stored and displayed, as may the performance data for other human taggers working on the tagging of related image content.

It should be noted that the collaborative aspect of the present invention is capable of utility with any suitable computer-implemented method of tagging, not just the audio-input/control pad method according to the first aspect According to a second aspect of the present invention, there is provided a computer implemented method of tagging and managing image content, the method comprising the steps of:
receiving and storing image data comprising digital image content;
displaying stored digital image content visually to a plurality of human taggers;
receiving an indication of a selected one of a plurality of characteristics associated with the image content currently being displayed to each human tagger;
identifying a respective metadata tagline corresponding to the selected characteristic;

receiving keywords entered by each human tagger and generating metadata therefrom, said keywords describing one or more characteristics associated with the image content being displayed to each tagger; and, associating the metadata with the image content as metadata tags in dependence on the respective metadata taglines, wherein the method further comprises the step of displaying visually to at least one human tagger information derived from at least one other human tagger.

The method will typically be implemented on a plurality of computers, each with processor, memory, visual display unit, keyboard and mouse, and in communication with a central computer system.

In some preferred embodiments of the present invention, the method further comprises the steps of:

receiving data identifying the physical location where received image content was first generated and also the time at which the received image content was generated;

associating the identifying data synchronously with the relevant image content;

determining, in dependence on the received identifying data, information about the physical location where the received image content was first generated; and, displaying the information about the physical location synchronously with displaying the image content.

This allows additional useful identifying information to be provided with the raw (or finalised) content, thereby enhancing its value still further. The identifying data will typically comprise GPS data identifying the physical location and allowing geotagging of the image content.

The information displayed may provide useful prompts to the human taggers and the audio content received in the audio data stream may comprise keywords spoken in response to the physical location information currently being displayed. Alternatively, the human tagger may speak a primary descriptive keyword in response to the image currently being viewed and the remaining descriptors for the metatagging may be generated automatically from a database of information about the physical location associated with the geotagged image.

In this way, the client may interface with the invention through an application running on a mobile device and may transmit the time-stamped location data independently of supplying the actual image content or footage being shot at the location. The location data can then be associated with the relevant uploaded image content in a time synchronous manner, thereby providing useful information per se or else a source for rich descriptive metatagging to be generated from the input of a human tagger.

Although the geotagging concept has been described in the context of the metadata tagging of image content according to the first or second aspect of the invention, it should be noted that it is capable of independent utility and can be used with a variety of metadata tagging techniques.

According to a third aspect of the present invention, there is provided a computer implemented method of tagging image content comprising the steps of:

receiving image data comprising digital image content;

displaying digital image content visually to a human tagger;

receiving data identifying the physical location where received image content was first generated and also the time at which the received image content was generated;

associating the identifying data synchronously with the relevant image content;

determining, in dependence on the received identifying data, information about the physical location where the received image content was first generated;

displaying said information about the physical location visually to said human tagger synchronously with displaying the image content;

receiving an indication of a selected one of a plurality of characteristics associated with the image content currently being displayed to the human tagger;

identifying a respective metadata tagline corresponding to the selected characteristic;

receiving keywords entered by the human tagger and generating metadata therefrom, said keywords describing one or more characteristics associated with the image content being displayed to the tagger; and, associating the metadata with the image content as metadata tags in dependence on the respective metadata taglines.

The method will typically be implemented on a computer with processor, memory, visual display unit, keyboard and mouse, which is in communication with a central computer system.

Furthermore, the concept is capable of even more independent utility and, as such, the basic geotagging method described above could be used to add geotags to image content after it has been generated (post-shoot) independently of whether any rich metadata tagging is subsequently performed.

According to a fourth aspect of the present invention, there is provided a computer program product for causing a computer or computers to execute the method steps of the above aspects of the present invention. Again, the geotagging method steps could be performed independently and a computer program product for causing a computer to execute these method steps is contemplated. In reality this program product would typically be a mobile application for running on a mobile device such as a mobile telephone or PDA.

According to a fifth aspect of the present invention, apparatus for tagging image content comprises:

display means for receiving image data comprising digital image content and for displaying the image content visually;

means to receive audio content and to generate an audio data steam therefrom, wherein the means comprises a microphone and wherein the audio content comprises spoken keywords describing one or more characteristics associated with the image content being displayed, respective keywords being spoken by a human tagger in response to the image content currently being displayed;

processing means adapted to process the audio data steam and identify the keywords therein, the processing means being further adapted to generate metadata from the keywords and to associate the metadata with the image content as metadata tags synchronously with the occurrence of the respective keywords in the audio data stream; and, means to select each of a plurality of characteristics associated with the image content being displayed and to generate a signal representative thereof, wherein the processing means is adapted to identify a respective metadata tagline corresponding to each representative signal and to generate and associate the metadata with the image content in dependence on the respective metadata taglines, wherein the selection means comprises a control pad having a plurality of keys or buttons, each of the plurality being assigned to a different characteristic.

The apparatus will generally comprise a computer with processor, memory, visual display unit, keyboard and mouse. However, the use of an audio input means allows the keywords from which metadata is to be generated to be spoken by a human tagger whilst simultaneously viewing the image content to be tagged. Moreover, for the selection and entry of each tagline, the usual combination of mouse and keyboard is replaced with a single control method nearly all people know, namely a control pad, such as a games console joy pad. Each of the keys or buttons of the control pad are assigned to a different characteristic. By assigning the different metadata layers to buttons on the pad, the operator will be able to jump between layers instantly, speeding up the process. This allows for the easy "layering" of metadata and the attendant advantages in terms of the richness of the metadata tagging.

The control pad may also comprise means to navigate an onscreen menu displayed on the display means. Preferably, the control pad comprises means to control the speed of playback of the image content being displayed. In this way, the operator is also able to pause, fast-forward, rewind, jump scenes and generally interact with the content via the shoulder buttons and d-pad on the games controller. This further immerses them in the content, promoting enjoyment, and hence more accurate tagging. The navigation and control means of the control pad can take any suitable form, such as d-pad, roller ball, and joystick, which facilitate easy use by the operator alongside the keys or buttons used to select characteristic/tagline.

Of course, a conventional keyboard and mouse may be used for the usual data entry and navigation functions to supplement those of the microphone and control pad. For example, whilst the primary data entry is performed using the microphone and control pad, subsequent correction or amendment of the metadata keywords may be performed using the keyboard, and if required, the mouse.

It is preferred that the audio content receiving means comprises a directional microphone. This type of microphone is well suited to capturing words spoken by a human operator and may be part of a headset. The combination of a headset (with directional microphone) and games controller connected to a computer performing the necessary processing provides an optimum and coordinated method for fast and detailed data entry by a human operator, which is then converted into a rich, layered meta-tagging of image content.

Thus, operators will "talk" in the metadata via a headset microphone. They will simply "say what they see". This has multiple benefits. It takes them away from the keyboard and makes it feel like they are interacting with the content. It is by far the fastest way to describe what is happening on screen. Noise words (the, err, a, swear words etc) can be filtered by the software.

According to a sixth aspect of the present invention, an image content management system comprises:
  a plurality of image content tagging apparatus according to the fifth aspect of the present invention;
  a central processing system in communication with each of the plurality of image content tagging apparatus, the central processing system comprising a server for serving image content to the plurality of image content tagging apparatus and to one or more clients; and,
  a data store for storing image data and associated metadata, the data store being in communication with the central processing system.

In this way a centralised system is provided for storing and managing image content and the associated metadata and for sharing information. Moreover, the centralised system allows for a more collaborative approach to tagging. This collaborative approach need not be limited to image content tagging apparatus according the fifth aspect of the invention, but with a wider range of image content tagging apparatus.

According to a seventh aspect of the present invention, an image content tagging and management system comprises:
  a plurality of image content tagging apparatus;
  a central processing system in communication with each of the plurality of image content tagging apparatus, the central processing system comprising a server for serving image content to the plurality of image content tagging apparatus and to one or more clients; and,
  a data store for storing image data and associated metadata, the data store being in communication with the central processing system,
  wherein each of the plurality of image content tagging apparatus comprises:
    display means for receiving image data comprising digital image content and for displaying the image content visually to a human tagger;
    means for the human tagger to enter keywords describing one or more characteristics associated with the image content being displayed;
    means for the human tagger to select each of a plurality of characteristics associated with the image content being displayed and to generate a signal representative thereof; and,
    processing means adapted to generate metadata from the keywords, to identify a respective metadata tagline corresponding to each signal representative of a characteristic, and to generate and associate the metadata with the image content as metadata tags in dependence on the respective metadata taglines, and
  wherein the system is adapted to display visually on the display means of one image content tagging apparatus information derived from entries by a human tagger using another of the plurality of image content tagging apparatus.

The system will typically comprise a plurality of computers, each with processor, memory, visual display unit, keyboard and mouse, and in communication with a central computer system with central data storage.

Preferably, in the content management system, the image data comprising digital image content having a first image resolution is stored in the data store and image data comprising the digital image content having a second image resolution lower than the first is served to the image content tagging apparatus.

In a similar manner, the tagged image data comprising digital image content having a first image resolution and associated metadata can be stored in the data store, and the tagged image data comprising the digital image content having a lower second image resolution and the associated metadata can be served to a client for viewing and/or editing.

In this way, the high resolution version of the content is primarily made available when actually required, and lower resolution versions can be deployed during the tagging or post-tagging editing and review process.

The centralised system allows for methods to deal with the boredom and brain freeze issues often associated with human tagging operators. For example, content to be tagged may be divided into sections and distributed between different members of a tagging "team". In this way, an hour's worth of content to be tagged may be divided into five sections, for a team of five operators, meaning that each member of the team will only have to work on a maximum twelve minute section. Similarly, as the content is being metatagged in teams of five, with each completing a short section, the system will show each operator the tags being created by the other members of the team, some of whom may be tagging ahead, while others are behind. Whilst not always directly relevant this will aid lateral thinking.

The present invention allows a service to be offered that, for the first time, will provide clients with storage online, and the ability to search and sell the thousands of video assets they create every year. The invention makes the process of adding keywords (or "metadata") to content, so as to make it searchable, up six times faster than current methods, thereby facilitating a financially viable solution to the problem.

Furthermore, the system may comprise a transcoder for transcoding the tagged image data for streaming to another device, such as a mobile device. In this way the image data can be coded in the appropriate format for a given browsing device.

In some preferred embodiments of the invention, the system is adapted to:
receive data identifying the physical location where received image content was first generated and also the time at which the received image content was generated;
associate the identifying data synchronously with the relevant image content;
determine, in dependence on the received identifying data, information about the physical location where the received image content was first generated; and,
display, on the relevant tagging apparatus display means, said information about the physical location synchronously with displaying the image content.

This functionality of the system can be utilised with any combination of tagging apparatus or can be used independently of the metadata tagging functionality to provided standalone geotagging of image content. Typically, the identifying data comprises GPS data identifying the physical location.

According to a eighth aspect of the present invention, there is provided a user interface embodied on one or more computer readable media and executable on a computer, said user interface for use with meta-tagging of image content, said user interface comprising:
an image content presentation area for displaying digital image content;
a time line area for displaying a time line representation of a sequence of digital image content, including an indicator of the position in the timeline of the image content currently being displayed, the time line representation including a plurality of respective bars indicative of meta-tagging of the image content in the sequence, each bar indicative of the type of meta-tagging and the duration of the image content to which it applies.

Typically, the width of each bar will be indicative of the duration of the image content to which the meta-tagging applies, and the colour of the bar will be indicative of the layer of meta-tagging to which the bar applies, for example the particular tagline type. In this way, the time line in the interface gives a ready visual indication to the operator of where in the sequence of image content the meta-tagging is concentrated, and also the richness and diversity of meta-tagging at any given point in the sequence.

The interface may also have an item presentation area for displaying thumbnail images and associated descriptive metatags for particular image content in the sequence. This area may be interactive, allowing selection and display of a particular image. The user interface may also have a text presentation interface overlaying part of the image content presentation area, the text presentation interface for displaying the descriptive metatag keywords as the user selects a clip in the timeline and moves their mouse over the content as it plays. Typically, every keyword added to the clip will displayed opaquely over the content.

The user interface of the eighth aspect of the present invention can advantageously be employed in the apparatus, system and method of the various aspects of the present invention.

According to a ninth aspect of the present invention, a method of serving data comprises the steps of:
receiving image data comprising digital image content having a first image resolution;
storing the received image data having the first image resolution;
tagging the stored image data with metadata descriptive of the image content; and,
serving from a server the tagged image data comprising the digital image content having a second image resolution, wherein the second image resolution is lower than the first image resolution, and wherein the lower resolution image content of the served image data is editable while retaining the descriptive metadata tagging associated with the higher resolution image content.

Typically, the high resolution meta-tagged image content will be stored electronically in the data storage of a central computer system and served by a central server at the lower resolution to one or more local computers for viewing and editing by a user. The important feature of this aspect of the invention is that the meta-tagging associated with the local low resolution version of the image content and with the centrally stored high resolution version of the image content remains linked. Thus, edits to the low resolution version of the image content can be replicated with associated metadata in a centrally-stored high resolution version of the image content. In this way, the central system is "watching" for changes or edits to the served low resolution version of the image content.

In some embodiments, the tagged image data comprising the lower resolution image content is served over a web browser. Preferably, the lower resolution image content is searchable by reference to the associated metadata. Alternatively or additionally, the lower resolution image content is searchable semantically.

Thus, in this aspect of the present invention, the lower resolution image content of the served image data may be edited whilst still retaining the associated metadata tagging. Modification data relating to the served image data may be received back at the server and automatically linked it to the stored tagged image data comprising the image content having the first resolution. In the case the image content has been edited, the modification data received back at the server may relate to edits of the served image data and may include new image content. In this way the lower resolution image content can be viewed, edited and augmented and modification data identifying the changes or selections is sent back to the server together with any associated metadata and is automatically linked to the high resolution version of the image content stored in a central data storage facility.

Preferably, the tagged image data is served to an end user device in a format compatible with said device and comprising the image content having a resolution compatible with the end user device. The end user device could be a portable device, such as a lap top computer or PDA, including an iPhone or similar device.

According to a tenth aspect of the present invention, a computer program product is provided comprising one or more computer-readable media having thereon computer-executable instructions that, when executed by one or more processors of a computer, causes a computer to execute the method steps the ninth aspect of the present invention.

In the present invention, either via a central upload room or using their own links, client's raw footage will be uploaded to the image content management system, making it instantly secure. This content will then be metatagged, and low-resolution copies created, making it available to the client via a standard web browser. In this way, clients can interact with their footage within hours of filming.

This possibility alone will change the way clients use their content, but via the web browser they can download it into the professional editing system of their choice, allowing them to create content without having to use a costly post production company. Once finished, the project files (not the data) are uploaded back to the system and re-united with the original footage. From here it can be sent, for example, to a special effects company for further work.

The result is the creative company having total control, for the first time ever, of the creative process, but also for the first time, having an instantly available online, fully metatagged copy of their finished content. From the system, they can then send this worldwide to anyone they choose, create new copies for mobile, the web or international broadcast, and all without tying up their staff with tapes, couriers or post production facilities.

Most significantly, via an online commerce presence, clients can sell their finished content direct to consumers, syndicate it to Internet broadcasters, and crucially, as it is metatagged, generate revenue from targeted advertising around it. Simultaneously, their unused footage, to which they may own the Intellectual property rights, and which currently is effectively valueless, can be sold as stock footage to a worldwide community of producers, realizing valuable extra revenue.

Alongside this, clients archive material can be sent to a Digitizing factory, using robotic systems to upload tapes in extremely large quantities and at low cost. Since no company or archive can afford to use the teams in the call centre to add metadata, and the timescales will be longer, home based workers, served video via broadband to their web browser, will be used to add metadata, in a similar vein to Wikipedia. Such home based workers may be incentivised by a small micro payment initially, but in order to promote quality tagging, they may be offered a cut of the revenue if a clip sells. This will enable an army of people worldwide, complete with their specialist knowledge, to be utilised.

As will be appreciated by those skilled in the art, the present invention provides a simple yet elegant solution to the problem of tagging image content with rich metadata, which in turn enables its searching. Moreover, an integrated system can be realized, which provides for the storage of tagged digital image content, with near immediate access to tagged raw footage for viewing and editing, and for easy searching and accessing of finalized footage, thereby allowing owners of rights to the footage to realize its commercial potential. The invention is not limited to applications in the shooting of commercial video or film footage, but could also be used for footage shot in non-commercial type environments, such as a hospital operating theatre. The invention could also find application in the tagging of still image content, such as photographs and the like.

BRIEF DESCRIPTION OF THE DRAWINGS

Examples of the present invention will now be described in detail with reference to the accompanying drawings, in which.

DETAILED DESCRIPTION

Figure 1:
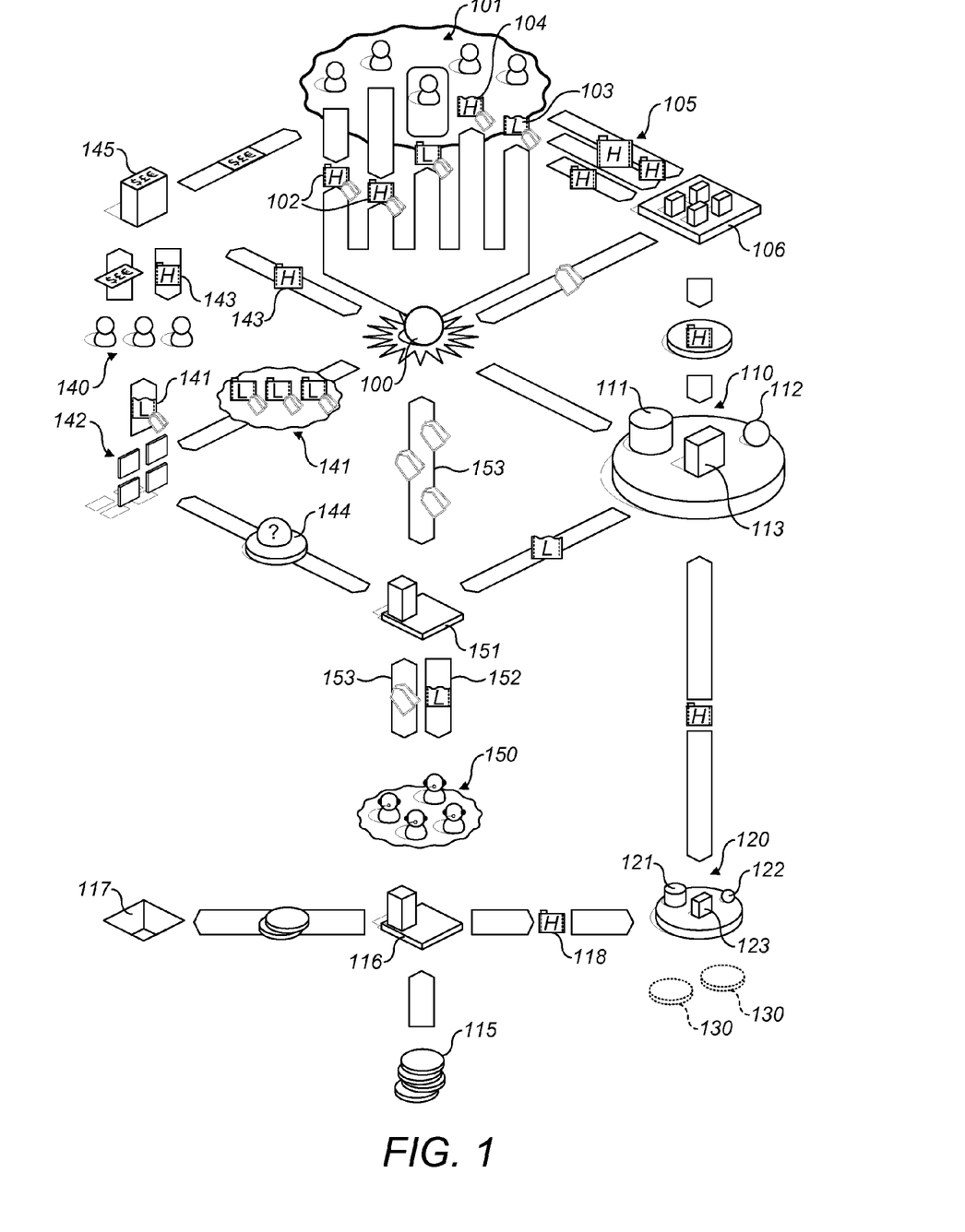
FIG. 1 shows a schematic overview of the tagging system and procedure.

FIG. 1 provides a schematic overview of a complete system according to the present invention. At the heart of the system is a Media Asset Management System (MAM) 100, which is in communication with the other component parts and provides for central control of all data and processes. A suitable MAM system is the Artesia system provided by Open Text. The interface and editing management may be based on MXF Server provided by Film Partners and the server management might be run by IBM Vmware.

In particular, the MAM is in communication with clients 101 from which it receives high resolution image content 102 and returns the content with synchronized metadata 102. Tagging with metadata is consistently indicated throughout the figures by a small meta-tag symbol appended to the tagged item. Three such tag symbols are shown appended to element 153 in FIG. 1. The high resolution image content may be downloaded 102. However, as indicated, the tagged content may be returned as low resolution streaming media 103, making it suitable for local searching and editing, or may be returned as a final high resolution streaming media version 104. The client can interact with the system to obtain a tagged version of the raw video footage at low resolution 103 and perform post processing on it, before returning the finalized high resolution footage 102 for storage whilst maintaining the metadata synchronization. Clients can use any suitable editing system, such as Final Cut Pro provided by Apple, AVID or Adobe systems.

The client may also be in communication with the MAM 100 via a management application running on a mobile device having GPS facility for pinpointing the location of the device. The application will be served for compatibility with the operating system of the mobile device in question. The real-time GPS data and associated time stamp can be then uploaded via the application and associated with the particular project. At a later time this identifying data can be reconciled with the footage shot at the location in a time synchronized manner.

The original high resolution footage may be supplied by the client in various formats, which will often not be digital. In this case the footage is sent 105 to an ingest room 106 for digitizing prior to tagging. There will typically be a variety of different client types 101, including those with their own servers and those whose connect directly. Other types may check in and out or may only be concerned with archive material (i.e. prosumer). Provision is made for all types of clients. In a preferred implementation, all image content will be received via the ingest room, 106, 116, whether delivered by courier or uploaded as data, as it provides a fast central repository.

Any basic metadata already associated with the content is recorded under control of the MAM 100. The digitized footage is stored in a primary data centre 110, which is mirrored by one 120 or more 130 back-up data centres. These centres typically comprise a tape and/or disc storage system 111, 121, a redundant MAM 112, 122, and a transcoding engine 113, 123. A similar procedure can be used to digitize and store archive footage supplied by clients, and which can then be tagged as and when appropriate. The archive footage 115 is supplied to a digitizing factory 116 for digitizing, after which the high resolution digitized footage 118 can be downloaded for storage in the data centre 120. The original tapes can be stored in a long term storage facility 117.

The MAM also mediates the delivery of tagged content 141, 143 to end content customers 140 who may wish to search and obtain high resolution copies 143 of footage stored by the system. The Typically, the requested content is streamed at low resolution 141 via the web and can be searched with the aid of semantic assistance tools 144, before the customer 140 requests and obtains a high resolution version 143 of particular footage. The provision of the low resolution footage may be via a sales front end 142, which allows the customer 140 to browse and purchase media. The web portal will typically be implemented using a platform from either Microsoft or IBM web services. A separate payments system 145 manages the associated payments transactions, including processing payments received from the content customers 140 and passing on remuneration to the (client) owners of the footage with a suitable fee deduction for providing the service.

A key component of the overall process is the army of human taggers 150, who provide the input for the rich metadata tagging of the image content. The taggers 150 may be based locally in a more centralized tagging facility or may be distributed home workers. They may work individually on a given project or may be part of a team tagging a particular piece of footage. The MAM 100 is in communication with the tagging stations 150 via a tagging factory 151, which supplies low resolution copies of digital image content 152 to the taggers 150 via their respective tagging station and receives back tags 153 for association with the content. The tagging factory 151 then adds the tags as metadata to the content, the metadata being synchronized with the content. The data is stored on a database, which will typically be a variant of SQL.

Figure 2:
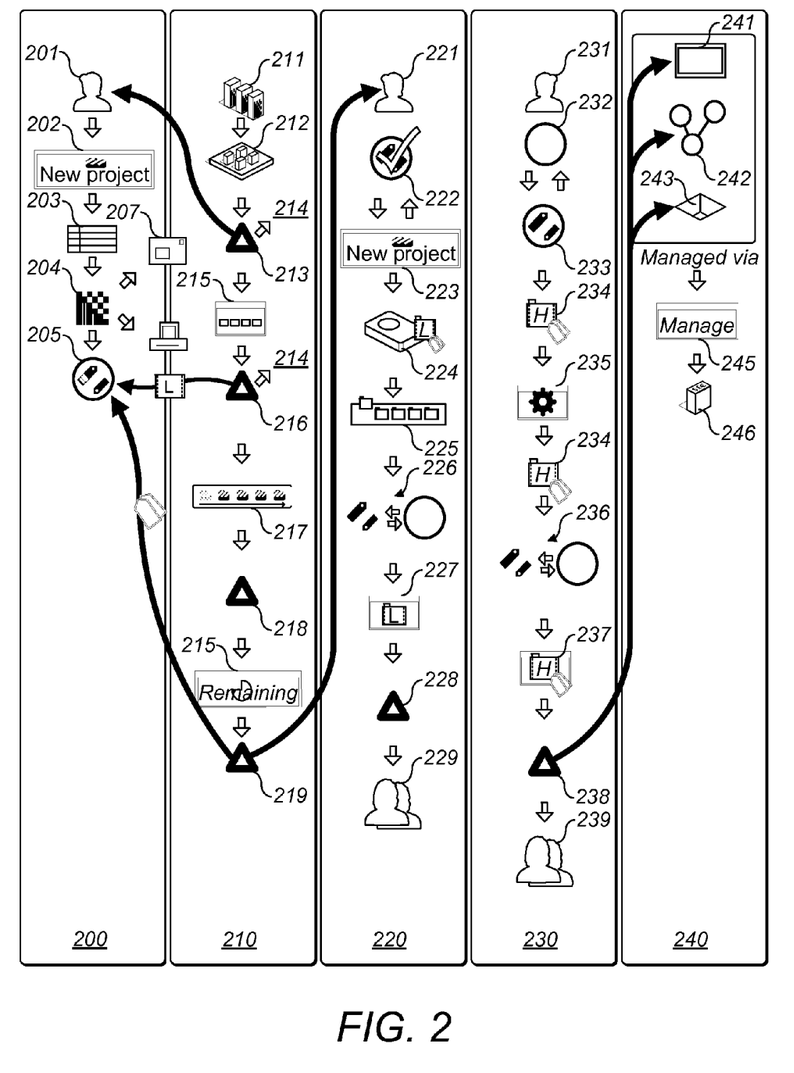
FIG. 2 shows a client side overview of the tagging procedure.

FIG. 2 provides a schematic overview of the process from the perspective of a client 201, starting with the initial interactions before any footage is shot 200 through the after shoot processing 210, including tagging, and the post tagging editing process 220, and on to the in post finalization of the tagged footage 230 and its provision to end content consumers 240. Typically, before filming, the client 201 (for example a production manager) visits a website, signs up for the service and downloads and installs the management application 202. After logging in, the client adds production details, such as title, number of hours of footage, characters, script and any associated media. In doing so, project file is set up 203. Barcodes and/or QR codes may be generated for association with the project and materials 204, and which may be printed out from the website 206.

Once a project file has been set up, the client goes "on set" to an actual shoot, subsequent to which all the raw image (e.g. video) footage shot during the shoot is delivered 207 to the ingest room 212 of a central processing facility via courier, where it is processed. The client receives notification of which tapes have been received 213 at the ingest facility. Subsequent to this, the client can request a review 214 if a tape is missing or if the information supplied is incorrect.

Depending on the format in which the image content has been shot, the footage may then be digitized at the ingest facility 212 in an automated process. Media with machine readable codes 211 may also be inputted. The client 201 can log in to the web application 215 to view the progress of the digitising process for each individual media unit. The client is then notified that all of the media has been digitised 216 and can request a review 214 if something is not correct. The review can be performed online. The client chooses which files to start downloading and the Sync Manager 205 launches and begins downloading the selected files. The digitized footage is passed to the Tag Pipeline 217 and a tag team accepts the project. At some point the client receives a notification 218 of the scheduled start time of the metatagging process, after which the tagging process begins and metadata is generated and associated with the raw video content. The web application 215 may give an indication of time remaining until such time as the tagging is completed and notified as such 219.

In order to view and edit the digitized content, the client 221 opens their editing suite application 223 and creates a new edit project. The relevant file then appears in the client's 'virtual drive' 224 under that project name. At this point the client can pull clips into their edit and can also browse and edit the metadata that has been generated until such time as they complete the review/edit. The client builds edits using low resolution proxy files locally 225. The Sync Manager 222 monitors the status of the edit project, synchronising updates on demand or automatically with the central server 226. The client is able to view the full edit online, in a streaming mode, via the application 227 and can send the edit to others 229 to view. A notification 228 of the status of the project can be sent to multiple people for approval.

Once satisfied with the edited raw footage, the client can pass the edit onto a Post house for finishing 230. The Post house team member 231 interacts with the MAM 232 and downloads high resolution files 234 through their connection, again using a download manager 233. Post production software may be used for graphics and finishing work 235 after which the edits to the high resolution footage 234 and materials are synchronized 236. The footage and edit is checked out and checked back in once the post production process is completed. The client receives an email once the Post House has completed their edit and has access to a full resolution, metatagged copy of the image content via the web application 237 for downloading and distribution. A notification 238 of the status of the project may be sent to multiple people for approval 239.

At this point the client will typically decide how the finalised footage is to be commercialised. The client can choose to deliver it to a broadcaster 241 and/or syndicate via the web 242 or alternatives means. The client can also choose what they want to archive of the footage they have on the production servers. The client simply chooses the files they want to archive via a web interface and the selected files are backed up and stored on the long term Archive Storage 245. Finally, the client receives a bill for the project and a payment is taken via direct debit 246.

Figure 3:
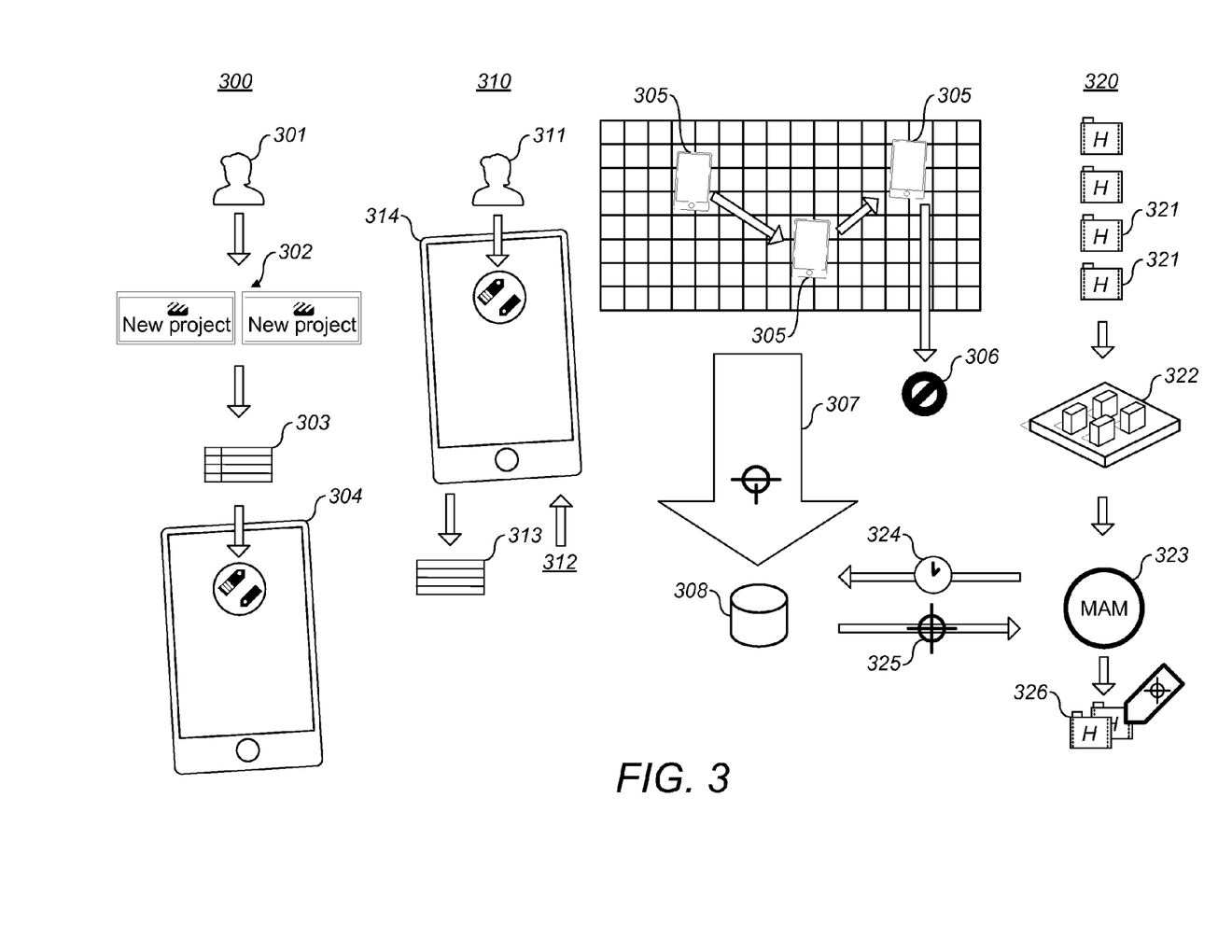
FIG. 3 illustrates the operation of the mobile Geo-positioning application.

During the actual shoot, the client may run the management application or some component thereof on a mobile device having GPS facility for pinpointing the location of the device. As illustrated in FIG. 3, before the shoot 300 the client 301 accesses the web application to set up a new project 302 and enters the details of the new shoot 303. The client may then download a particular mobile application 304 for interacting with the system. The mobile application will be served for compatibility with the operating system of the mobile device in question, whether it is an iPhone or an Android or MS Windows based mobile phone, or else some other type of mobile communication device. It is important to synchronise data/time settings on the camera(s) used for the shoot with the mobile device used for GPS tracking. The mobile application may generate a reminder for the user to do this, for example when the application is launched on the mobile device or a project selected for a new shoot.

During the shoot 310, the mobile application is launched 314 by the client team member 311, the shoot project is selected 313, and the application can run in the background or data can be checked in manually 312. As the mobile device 305 moves from location to location with the shoot, the onboard GPS system monitors the position of the device until the application is deactivated 306. The real-time GPS data and associated time stamp is broadcast or uploaded 307 via the application and associated with the particular specified project and stored 308. After the shoot 320 the high resolution footage 321 is delivered to the ingest room 322 for digitizing. At a later time the MAM 323 communicates with the location data store 308, sending the footage shoot ID and time 324, and receiving back the relevant stored Geo Data 325. This identifying data can be reconciled with the footage shot at the location in a time synchronized manner to provide a geotagged version 326 of the image content. As a consequence, the client can search their footage by street name, town and postcode immediately on it arriving into the system and being reserved to them.

Figure 4:
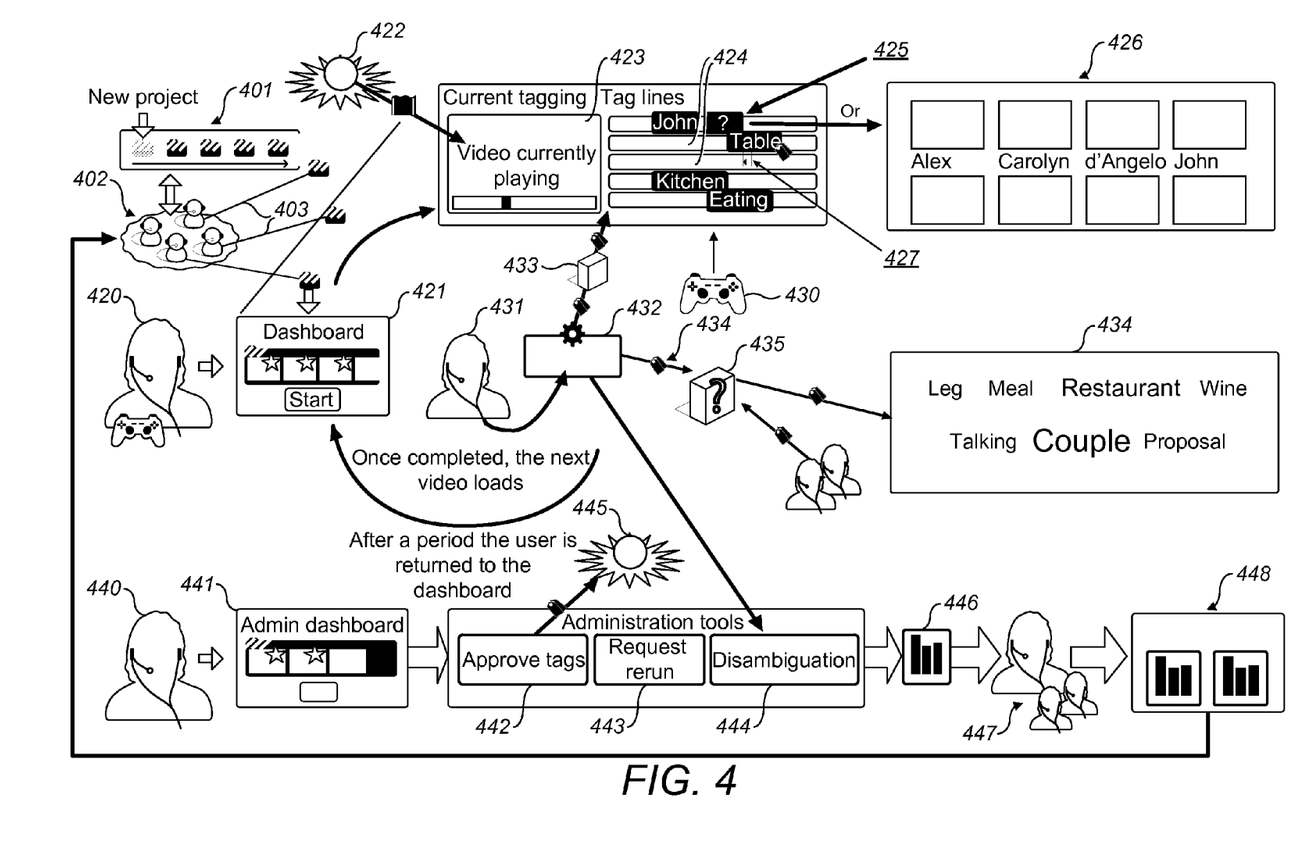
FIG. 4 shows a flow diagram of the tagging process.
Figure 5:
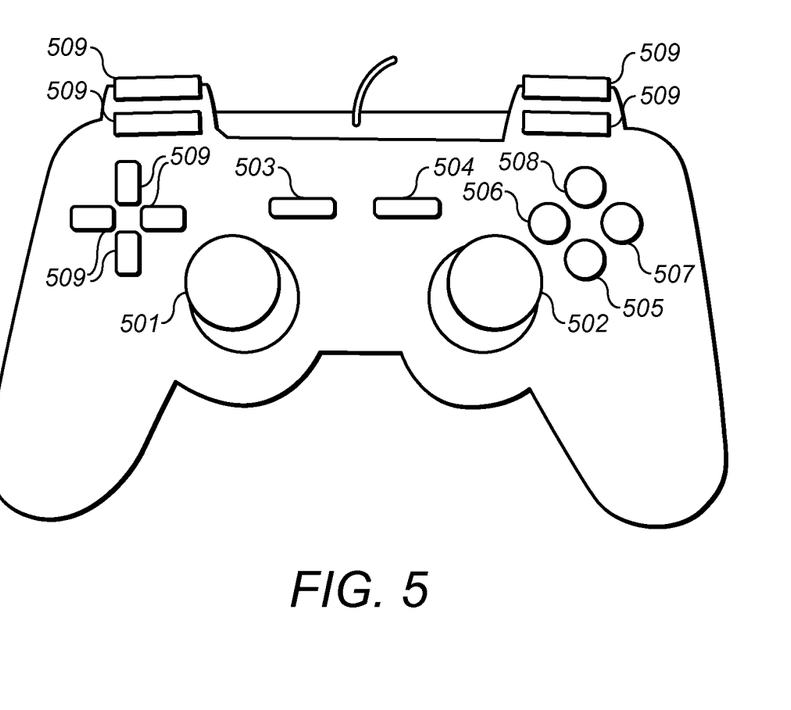
FIG. 5 shows an example of a tag pad for onscreen navigation and tag line selection.
Figure 6:
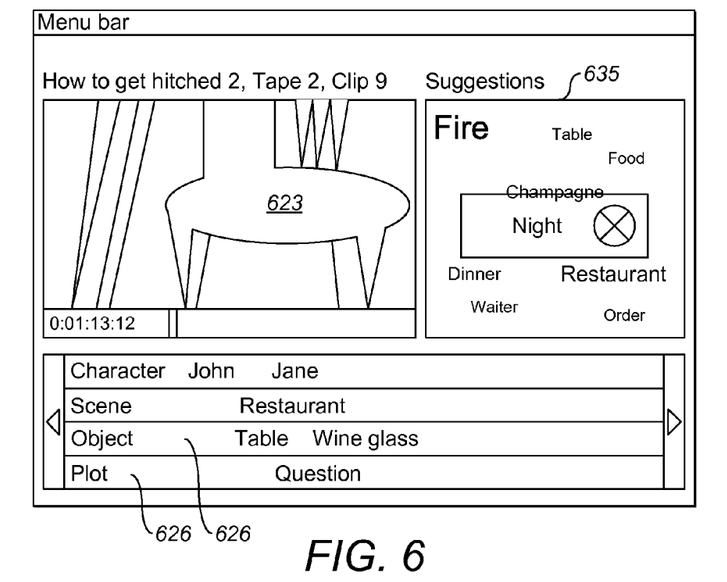
FIG. 6 shows an example of the tag screen.
Figure 7:
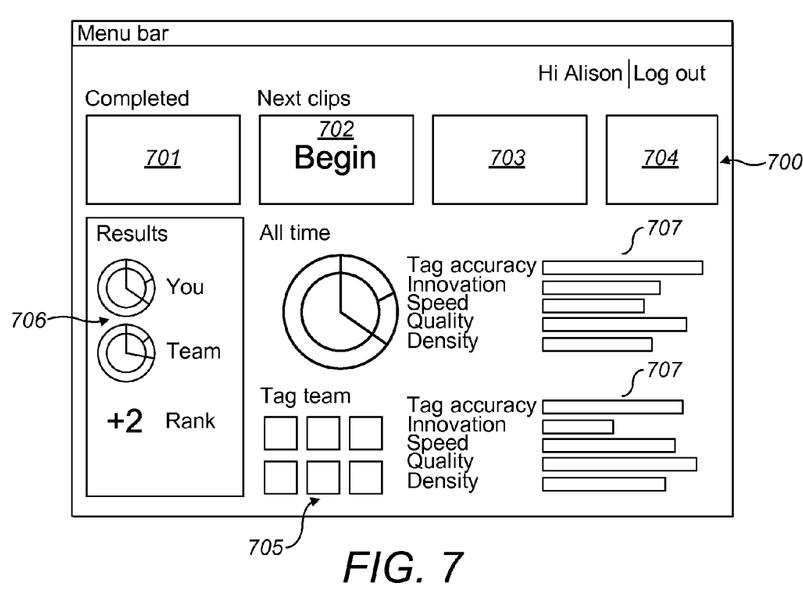
FIG. 7 shows an example of the dashboard screen.

We now consider the actual tagging process in a little more detail with reference to FIGS. 4 to 7. FIG. 4 provides a schematic overview of the tagging process and workflow, which is centred on the human tagger at their tagging station. FIG. 5 illustrates a tag pad (or console) for onscreen navigation and tag line selection by the human tagger. FIGS. 6 and 7, respectively, show an example of the Tag screen and an example of the Dashboard screen, as displayed to the human tagger.

As shown in FIG. 4, initially a project of videos is uploaded into a web application and appears in the Tag Pipeline 401 on the Dashboard. Team leaders 402 from each available Tag Team bid on who can achieve the best results with the footage. The projects are allocated 402 and the clips are added into the Clip Queues for each winning team. Each Tag Team Tagger 420 is located in front of a computer display wearing a headset with directional microphone and holding a games console type controller. An example of the latter is shown in FIG. 5.

The Tagger logs into the Tagging software and is taken to the Dashboard 421, shown in more detail in FIG. 7. A variety of information useful to the Tagger is displayed on this screen. In particular, a visual display of the Tagline for the current user 702 is presented, including the last clip completed 701, the next clip 702 awaiting tagging by the Tagger and subsequent clips 703, 704 to be tagged. The Tagger can also see a list of team members with graphic avatars 705, what his/her team is due to tag, the scores of other teams and of his/her team-mates 706 and more detailed statistics relating to his/her performance and the performance of the team 707. Such information can act as incentive and motivator to the Tagger.

To begin tagging, the Tagger is presented with the first clip 423 in the Tagger's Clip Queue in the Tagging Window, which is viewed as a video stream from the Media Asset Management (MAM) System 422. Below the video currently playing is a bar, which will display numeric data relevant to the clip being shown. The application software sets up several empty Metadata Taglines 424, and displays them on the screen next to the Tag Window. The five example Taglines illustrated in FIG. 4 are: Character, Location, Story, Object, Background, Emotion, and Action. Although not shown in FIG. 6, these taglines would appear at the left hand side of the relevant tagline bar with the descriptive text ("John", "Table" etc) entered for that tagline being shown further to the right. The snap shot of the Tag screen illustrated in FIG. 6 shows some typical Taglines 624.

The Tagger controls the playback of the video via the control pad 430 with functions which mimic standard video playback commands, such as fast forward, rewind, pause, play and a jog-wheel. FIG. 5 shows a games joy pad type console adapted for use with the invention. Navigation of the onscreen menu options 501 and jog control 502 is performed using the joystick type controllers. Certain buttons are programmed as shortcuts for certain onscreen functions or operations, such as pause 503, dashboard 504, confirm 505, undo 506, tag reference 507 and "mark as unknown" 508. The remaining buttons 509 can be assigned to the different taglines a Tagger may typically be working with. The Tagger switches between Metadata Taglines by pressing the appropriate buttons 509 on the control pad. Whilst a Tagline is selected, the Tagger 431 speaks into the microphone to describe what he/she sees at the current point of playback of the currently playing movie 423.

If the image content is raw footage that has been geotagged in the manner described above with reference to FIG. 3, then not only will the location and time data be available from the GPS location system, but that data can then be referenced against and linked to a resource such as Google Maps Enterprise. This allows the Tagger to see the location details of the image currently be viewed on a map on the tagging screen. Thus, for example, when the tagger sees a church on screen, the system can pick up the true name of the church using the location data. For example, the Tagger says "church", and the system interrogates the map data and notes that there is only one church within 100 meters of location, named "St Matthews", and tags the church as "St Matthews".

Voice Recognition Software 432 takes the audio stream of her recorded voice as an input, converting it into text or flagging it for disambiguation in the later quality assurance process. The Voice Recognition Software also removes extraneous sounds and optional words from a list stored in the Software Settings. If the Tagger is unable to recognise a given location, character or object he/she can assign a Tag Placeholder 425, for instance "Character A", which can then be corrected in the quality assurance process. The Tagger is also able to switch to the Tag Reference screen, thereby pausing the current playback and allowing the Tagger to browse stills from other Taggers' work 426 to find a definition for the item he/she is currently trying to tag. For example, characters will be displayed in a grid with their names below them based on having been successfully tagged by others.

The Tagging Software takes the text versions of what has been said from the Voice Recognition Software and inserts them as Metadata Tags into the currently selected Metadata Tagline for the current clip at the point 427 that the word occurred in the audio stream, with adjustment for word length and the Tagger's 'latency', which is a setting that can be adjusted in the Software Settings. The tags are stored in a local database 433. Each Tag is broadcast 434 to all of the other Taggers in the Tagger's team, as well as to any other user working on the project, including which Tagline it relates to, the position on that Tagline and its context within other Tags. As Tags are broadcast to other Taggers, the Software will recommend Tags 635 to each Tagger based on analysis of the tags that the Tagger has already added, tags that other Tag Team Members are using, and also recommendations based on dictionary or thesaurus look-ups and semantic analysis.

The suggestions may be mediated by a Tag suggestion agent 435. The tagging information is also sent to the Media Asset Management System (MAM) which stores each Tag in an SQL database and assigns it to the high resolution file.

Once the Tagger has completed tagging the current clip, the next is automatically loaded from the Clip Queue and the process continues. The process is overseen by a Quality Controller 440 for the team who is logged in to the Admin Dashboard 441. Once a given amount of video content has been tagged, the Quality Controller 440 is alerted and checks and corrects the content for errors. The Quality Controller uses Administration tools to approve tags 442, request a rerun 443 and for disambiguation 444. The Quality Controller signs off on the team's work, and the tags are committed to the main Media Asset Management System 445, and also injected into the High Resolution media files.

Once a piece of footage has been completed, a range of information relating to the tagging process is stored in the Tagging Software. Examples of such information include the accuracy of the Tagger's work, the density of keywords per minute, any unusual keywords used, and an indication if a given Tagger is the first to tag certain characters, objects and locations correctly. Other data about the Tagger and the Tag Team's performance may be stored in the Tagging Software, including scores 446 assigned to the Tag team members 447. The Tagger can view his/her performance ranked against other team-mates and other teams in a High Score Table type display 448 on the Dashboard, and the system offers hints, tips and encouragement to the Taggers.

Figure 8A:
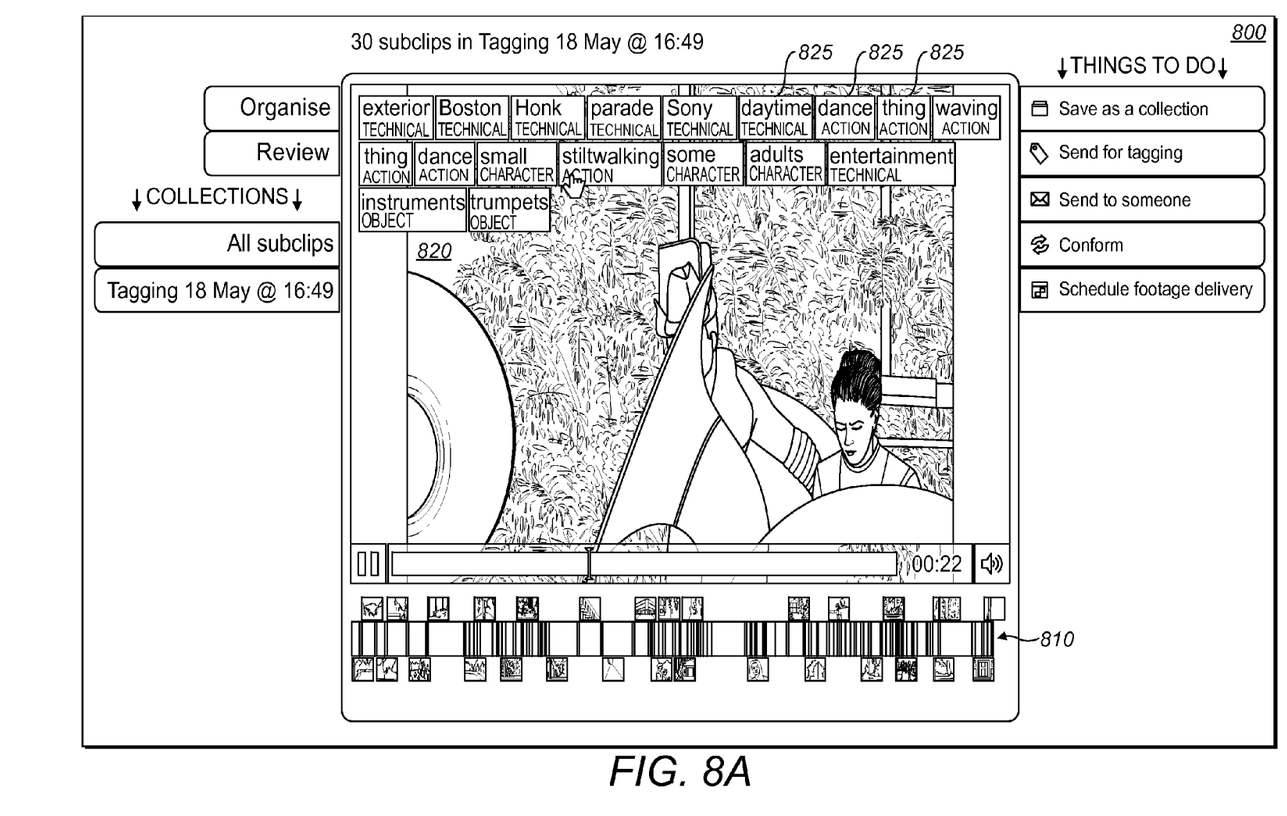
FIG. 8A shows a screenshot of the tagging user interface with keywords layered over a film clip; and, FIG. 8B shows a screenshot of the tagging user interface with a close up of the timeline and associated thumbnails.
Figure 8B:
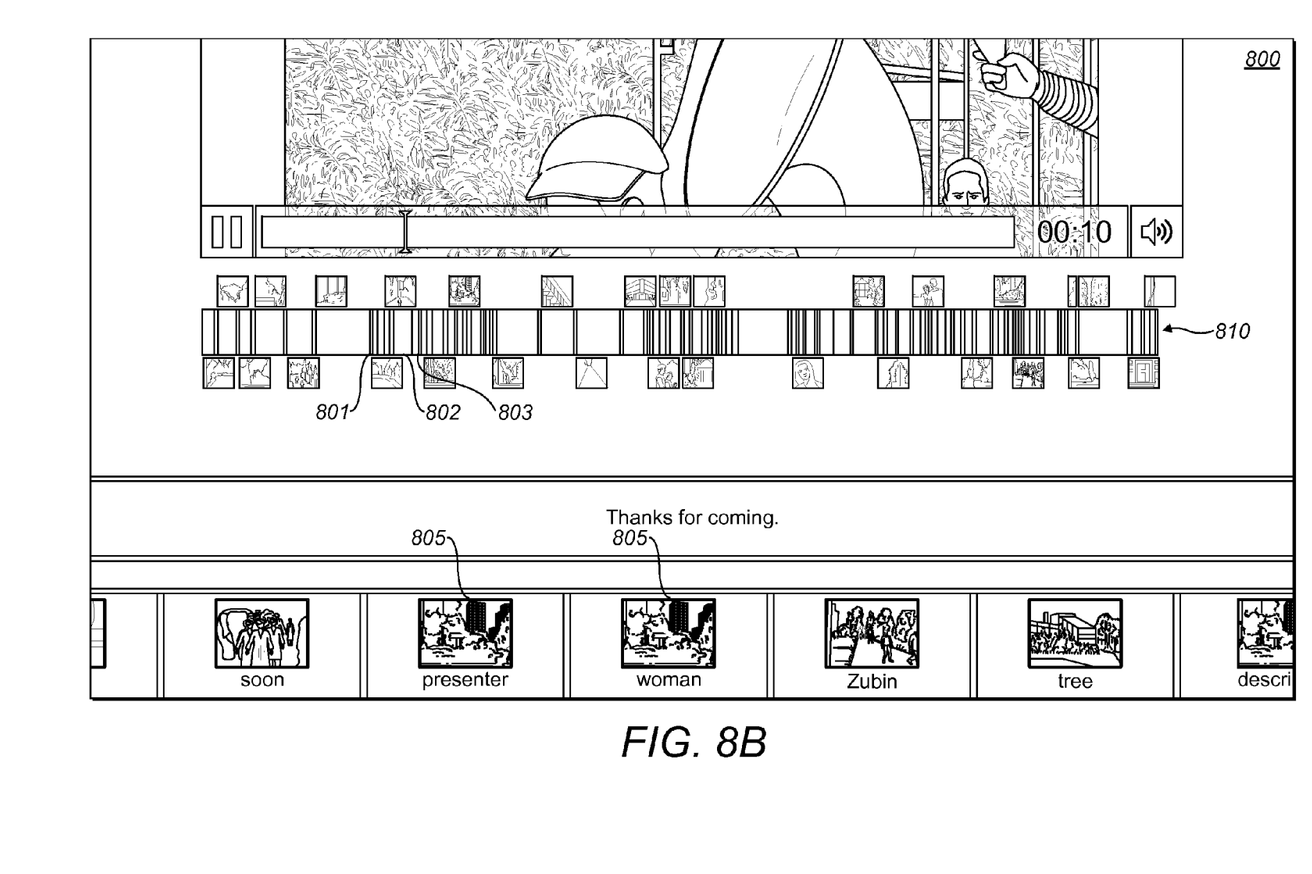

FIGS. 8A and 8B are representative line drawings of actual screen shots, illustrating a user interface with a piece of video content being tagged. As illustrated in FIGS. 8A and 8B, the process of metadata being added is shown to the user via a unique display (user interface) 800 that is both qualititative and quantitative in form. As each keyword is added to the footage, a line 801,802,803 appears on the clip timeline 810, which displays the exact timecode point at which the keyword has been added. The colour of the displayed line corresponds to the layer upon which the keyword has been placed, for example: Technical=grey line 801, Action=yellow line 802, Character=blue line 803. Via this feature the user can immediately see the quantity of metadata that is being added to each clip in what may be a large volume of content.

Simultaneously, as shown in FIG. 8B, a real-time display of every keyword added with a thumbnail 805 of the exact frame in the content scrolls across the bottom of the screen. This allows the user to see exactly what keywords are being added to what image so that they can accurately check the quality of the keywords. This means that via a single display, a large quantity of metadata becomes a meaningful and understandable dataset, which it previously has not been.

Furthermore, as shown in FIG. 8B, if the user selects a clip in the timeline 810, and moves their mouse over the content 820 as it plays, every keyword added to that clip will displayed 825 opaquely over the content 820. Each of these keywords can be clicked upon, and in doing so will take the user to the exact timecode point in the video where that keyword was added. Similarly, if the user hovers their mouse over one of the thumbnails 805 as they scroll across the bottom of the screen, the act of clicking on it will take them to the exact point in the content that that keyword was added.

Together, for the first time, these two powerful display innovations enable a user to be able to understand and interact with a high speed metadata process, as it happens in real time.

As indicated above, the software element used to implement the invention will typically be coded as a web application, since it will be used both in the metatagging factory and also for remote, home based workers. The latter can be served video over broadband at lower resolution for archive footage tagging purposes. A variety of incentives can be supplied for remote workers including remuneration based on the quality of their tagging and the subsequent provision of the tagged content to paying end customers.

The present invention provides an innovative method of tagging image content with rich metadata and serving the tagged data to clients and end consumers. The apparatus and system employs a number of readily available components, but also integrated in an innovative manner with proprietary interfaces. As will be appreciated by those skilled in the art, aspects of the invention can be implemented in a variety of different ways and the invention itself can be applied to a wide range of scenarios where image content can be usefully enhanced by the addition of metadata tags and the serving of the tagged content in searchable and editable form. The invention enables image content to be stored in a safe and readily accessible form and at a cost that is not prohibitive to the owners of the content. Moreover, the invention allows the creators or owners of the image content to edit and finalize raw content with increased functionality and also leverage the commercial worth of the finalized content through its enhanced searchability and provision when served over the web.

The invention claimed is:

1. A method of serving data comprising:
receiving image data comprising digital image content having a first image resolution;
storing the received image data having the first image resolution;
tagging the stored image data with metadata descriptive of the image content; and,
serving, from a server, the tagged image data comprising the digital image content having a second image resolution lower than the first image resolution, wherein the lower resolution image content of the served image data is editable while retaining the descriptive metadata tagging associated with the higher resolution image content.

2. A method according to 1, further comprising:
receiving, at the server, modification data relating to the served image data; and
automatically linking it to the stored tagged image data comprising the image content having the first resolution.

3. A method according to claim 2, wherein the modification data received back at the server relates to edits of the served image data.

4. A method according to claim 3, wherein the modification data received back at the server includes new image content.

5. A method according to claim 1, wherein the tagged image data is served to a portable device in a format compatible with the portable device and comprising the image content having a resolution compatible with the portable device.

6. A method according to claim 1, wherein the image date is raw image data.

7. A method according to claim 1, wherein the digital image content is video content.

8. A method according to claim 1, wherein the tagged image data comprising the lower resolution image content is served over a web browser.

9. A method according to claim 1, wherein the lower resolution image content is searchable by reference to the associated metadata.

10. A method according to claim 1, wherein the lower resolution image content is searchable semantically.

11. A computer program product comprising one or more non-transitory computer-readable media having thereon computer-executable instructions that, when executed by one or more processors of a computer, causes the one or more processors of the computer to perform a method for serving data, the method comprising:
- receiving image data comprising digital image content having a first image resolution;
- storing the received image data having the first image resolution;
- tagging the stored image data with metadata descriptive of the image content; and,
- serving the tagged image data comprising the digital image content having a second image resolution lower than the first image resolution, wherein the lower resolution image content of the served image data is editable while retaining the descriptive metadata tagging associated with the higher resolution image content.

* * * * *